Dec. 12, 1950     T. C. PATECELL     2,534,206

CONVERTIBLE AMPHIBIAN AIRPLANE

Filed July 25, 1945     4 Sheets-Sheet 1

*INVENTOR.*
THEODORE C. PATECELL
BY
*ATTORNEY.*

Dec. 12, 1950     T. C. PATECELL     2,534,206
CONVERTIBLE AMPHIBIAN AIRPLANE
Filed July 25, 1945     4 Sheets-Sheet 2
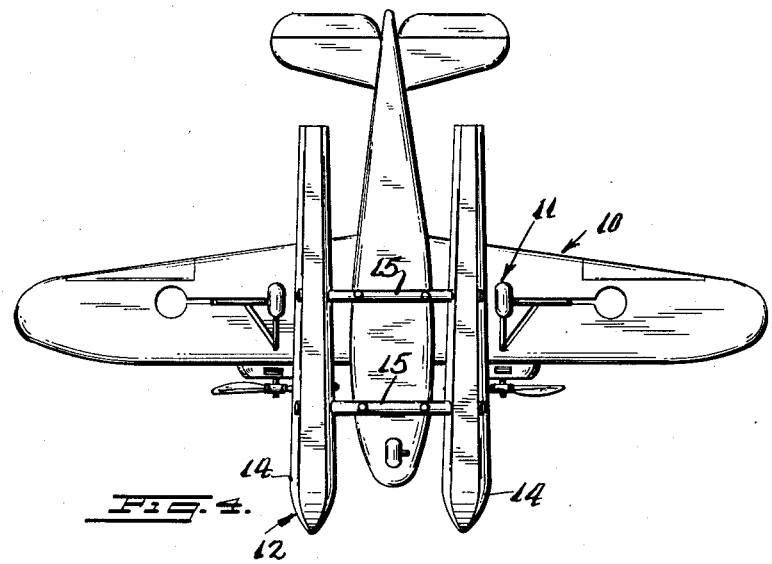
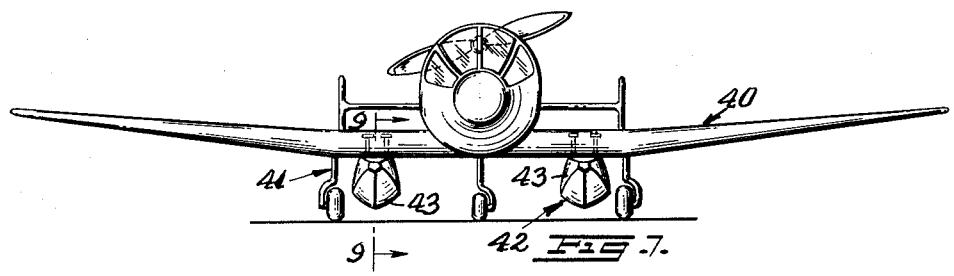
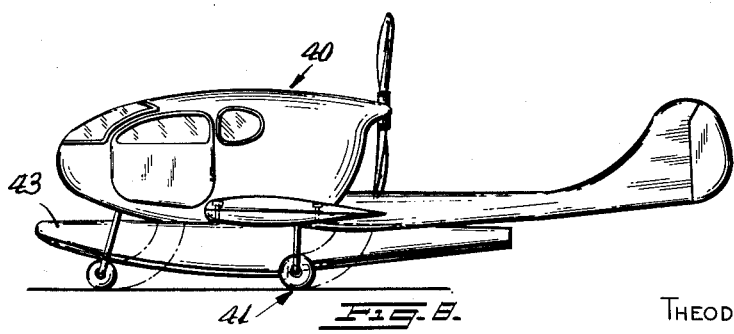
INVENTOR.
THEODORE C. PATECELL
BY
ATTORNEY.

Dec. 12, 1950  T. C. PATECELL  2,534,206
CONVERTIBLE AMPHIBIAN AIRPLANE
Filed July 25, 1945  4 Sheets-Sheet 3

INVENTOR.
THEODORE C. PATECELL
BY
ATTORNEY.

Dec. 12, 1950     T. C. PATECELL     2,534,206
CONVERTIBLE AMPHIBIAN AIRPLANE
Filed July 25, 1945     4 Sheets-Sheet 4
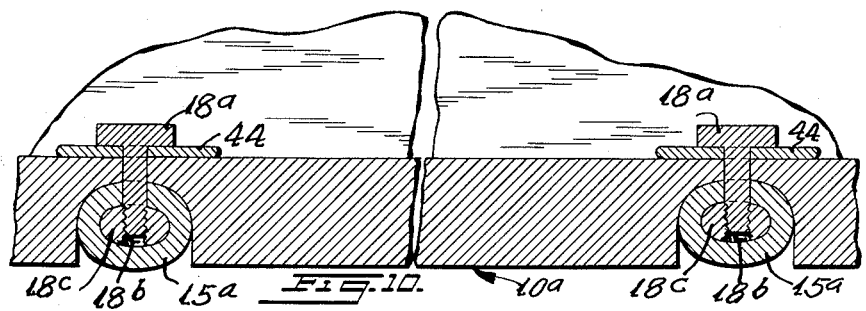
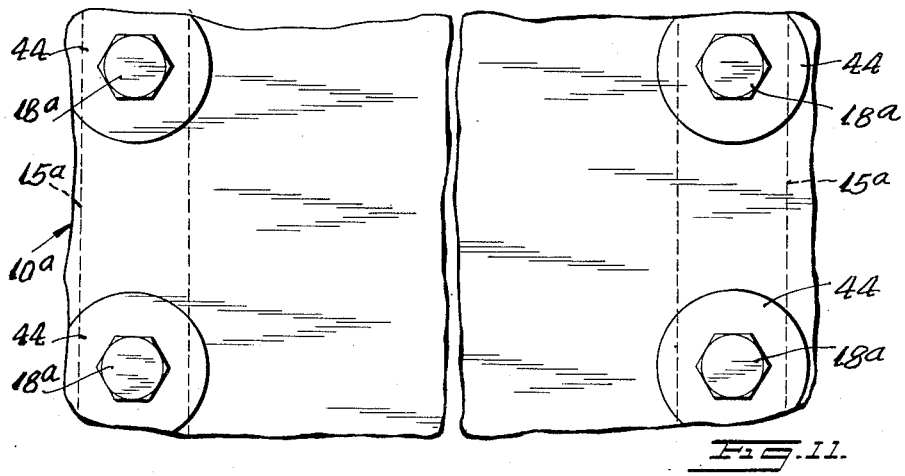
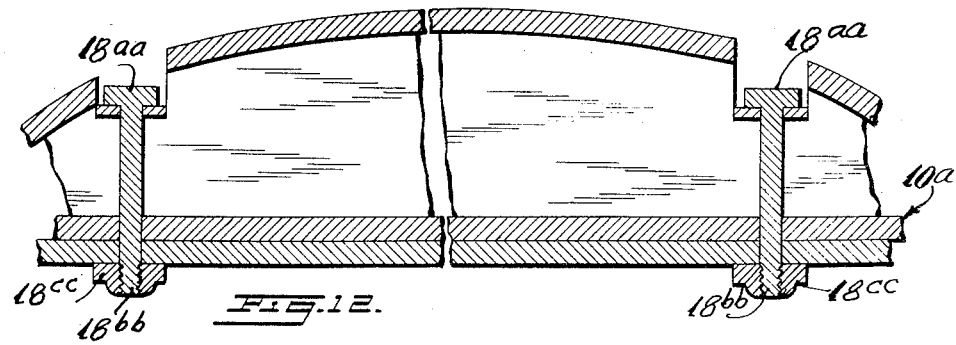
INVENTOR
THEODORE C. PATECELL
BY
ATTORNEY Patented Dec. 12, 1950

2,534,206

UNITED STATES PATENT OFFICE 2,534,206

CONVERTIBLE AMPHIBIAN AIRPLANE

Theodore C. Patecell, Jackson Heights, N. Y.

Application July 25, 1945, Serial No. 606,963

2 Claims. (Cl. 244—101)

This invention relates to new and useful improvements in a convertible amphibian airplane.

More particularly, the invention proposes an improved airplane which is in the nature of a land airplane and which is provided with an amphibian landing gear consisting of a retractable land gear which is independent of the seaplane gear and a removable seaplane gear associated with means for releasably holding it in position so that the airplane may be converted from an amphibian to a landplane only, quickly, and at low cost.

The invention contemplates numerous forms, each of which embodies the broad principles thereof. In this specification two forms are shown. In one of the forms the seaplane landing gear is in the nature of a pair of pontoons connected together with spaced rods. In the other form the seaplane landing gear consists of a pair of pontoons mounted directly upon the land airplane.

Still further the invention proposes a convertible amphibian airplane as briefly explained and which may be also adaptable for the use of jet propelled planes of all types and may be manufactured at a relatively low cost.

For further comprehension of the invention, and of the objects and advantages thereof, reference will be had to the following description and accompanying drawings, and to the appended claims in which various novel features of the invention are particularly set forth.

In the accompanying drawing forming a material part of this disclosure:

Fig. 4 is a bottom view of the airplane shown in Fig. 1.

Fig. 7 is a front elevational view of another airplane constructed in accordance with this invention.

Fig. 8 is a side elevational view of the airplane shown in Fig. 7.

Fig. 10 is a similar view to Fig. 5, but showing another form of the invention.

Fig. 11 is a plan view of Fig. 10.

Fig. 12 is another view similar to Fig. 10 but showing a still further modified form of the invention.

Figure 1:
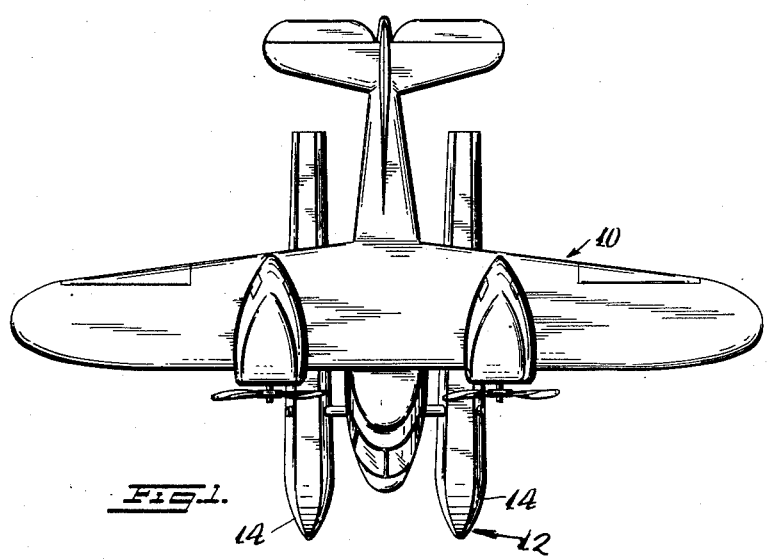
Fig. 1 is a plan view of a convertible amphibian airplane, constructed in accordance with this invention.
Figure 2:
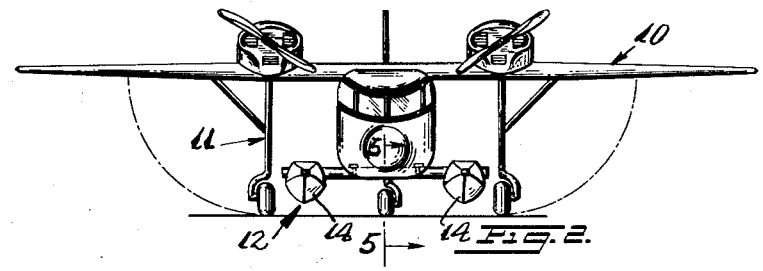
Fig. 2 is a front view of the airplane shown in Fig. 1.
Figure 3:
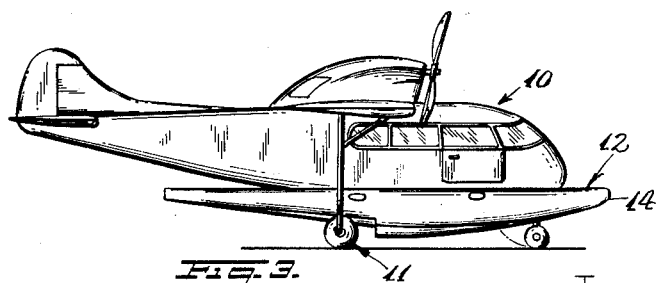
Fig. 3 is a side elevational view of the airplane shown in Fig. 1.
Figure 5:
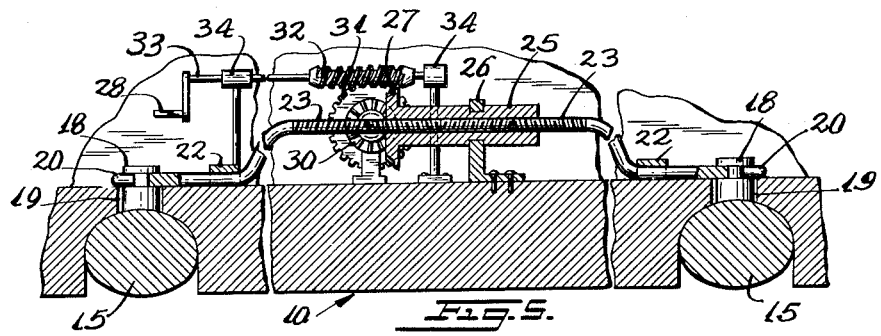
Fig. 5 is a fragmentary enlarged vertical sectional view taken on the line 5—5 of Fig. 2.
Figure 6:
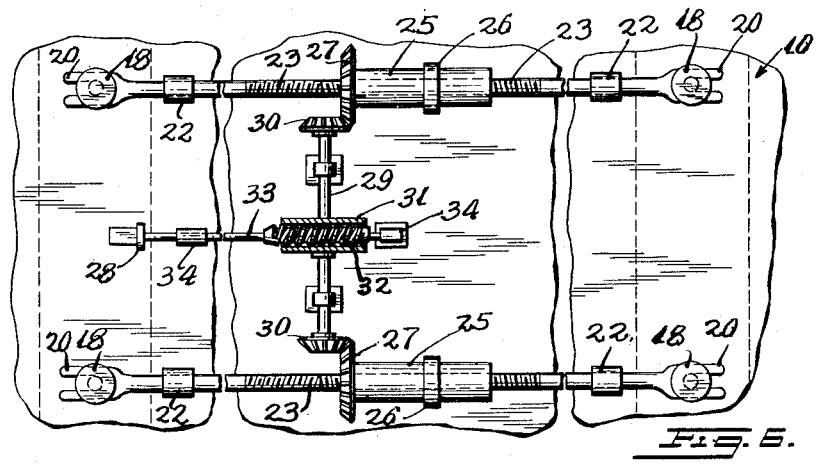
Fig. 6 is a plan view of Fig. 5.

The convertible amphibian airplane in accordance with that form of the invention disclosed in Figs. 1 to 6 inclusive includes a land airplane 10 having the usual land landing gear 11. A seaplane gear 12 is provided for the airplane 10. This landing gear 12 is releasably mounted in position so that it is possible to convert the airplane from one type to another.

The seaplane landing gear 12 includes a pair of spaced pontoons 14 which are rigidly connected together by spaced rods 15. The pontoons 14 are extended along the sides of the fuselage of the airplane. The land landing gear 11 is retractable in the usual way.

The seaplane landing gear 12 is releasably mounted upon the land airplane 10. This is accomplished with several headed studs 18 mounted on and projecting from the rods 15. These studs 18 pass up through openings 19 formed in the bottom wall of the fuselage of the airplane. Fork-like members 20 are provided for engaging annular grooves formed on the studs 18. More specifically, the fork-like members 20 are capable of releasably engaging the grooves of the studs 18 and in this way releasably hold the seaplane landing gear 12 in position.

The fork-like members 20 are associated with means by which they may be operated. The fork-like members 20 are arranged in opposed pairs. They are slidably supported in bearings 22. The adjacent ends of opposed pairs of the fork-like members are formed with threads 23 of opposite hand. These threads engage complementary threads formed in a bushing 25 which is rotatively supported upon a bracket 26.

The bushings 25 are provided with beveled gears 27 which connect up with a transmission terminating in a handle 28. The transmission includes a shaft 29 provided with beveled gears 30 meshing with the gears 27. The shaft 29 has a worm wheel 31 engaged by a worm pinion 32 on a shaft 33 which is rotatively supported in bearings 34. The shaft 33 is provided with the handle 28.

The handle 28 may be turned for indirectly causing the fork-like members 20 to be extended to engage the grooves of the studs 18, or to be retracted to release the studs 18.

Figure 9:
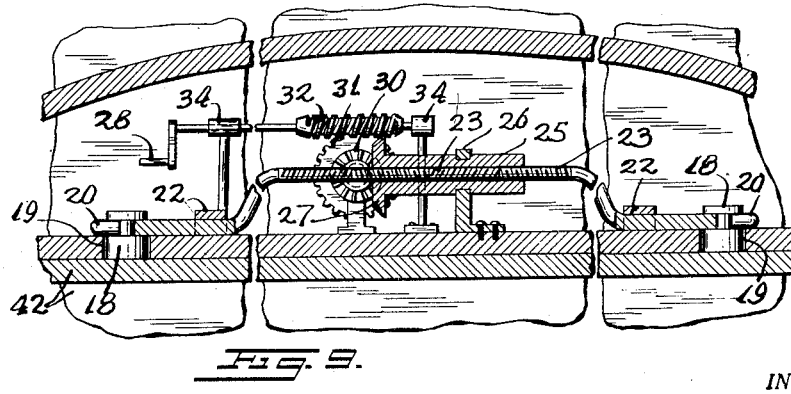
Fig. 9 is a fragmentary enlarged vertical sectional view taken on the line 9—9 of Fig. 7.

In Figs. 7 to 9 inclusive another embodiment of the invention has been disclosed. In this form of the invention the convertible amphibian airplane includes a land airplane 40 having the usual landing gear 41. A seaplane landing gear 42 is releasably mounted upon the land airplane 40. This amphibian landing gear 42 is in the nature of a pair of individual pontoons 42 or 43 mounted upon the bottom of the airplane 40.

Each of the pontoons 42 are provided with headed studs 18 which are engaged by fork-like members 20. The fork-like members 20 are associated with means by which they may be simultaneously operated.

In other respects this form of the invention is identical to the prior form and like parts have been indicated by like reference numerals.

In each of the airplanes disclosed it is possible to remove the seaplane landing gear and the airplane may be operated in the usual way as a land airplane without the seaplane weight and drag. The seaplane landing gear may easily be mounted back in position and then the airplane may be landed on and take off from bodies of water in addition to landing on airports by extending the aircraft's retractable wheels in flight.

In Figs. 10 and 11, the headed studs or bolts 18$^a$ are provided with threaded free ends 18$^b$ which are adapted to be engaged by complementary threaded nuts 18$^c$ located within tubular spreader bars 15$^a$. A suitable washer 44 is provided under the head of each bolt 18$^a$.

This arrangement makes it possible to readily attach or detach the pontoons to and from the aircraft 10$^a$.

In Fig. 12 the bolts 18$^{aa}$ are shown to be threaded at 18$^{bb}$ and locked in position by suitable nuts 18$^{cc}$. In other respects this form of the invention is similar to the previous forms.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. In an airplane having a fuselage, wings and a landing gear for use on land, a pontoon-type landing gear for use on water, and means for releasably attaching said pontoon-type landing gear in position, comprising studs on said pontoon type landing gear extended into a hollow portion of the airplane, said studs being formed with annular grooves adjacent the ends thereof within said hollow portion, slidably mounted fork-like members within said hollow portion engaging said grooves of said studs retaining said studs in position extended into said hollow portion, and means for moving said fork-like members to engage and disengage them from said grooves of said studs, said moving means comprises tubular bushings having threads of opposite hand formed in the ends thereof, said fork-like members being arranged in opposed pairs and formed at their adjacent ends with threads of opposite hand engaging said threads of opposite hand formed in the ends of said tubular bushings, and means for rotating said bushings in one direction or the other to extend and retract said fork-like members.

2. In an airplane having a fuselage, wings and a landing gear for use on land, a pontoon-type landing gear for use on water, and means for releasably attaching said pontoon-type landing gear in position, comprising studs on said pontoon-type landing gear extended into a hollow portion of the airplane, said studs being formed with annular grooves adjacent the ends thereof within said hollow portion, slidably mounted fork-like members within said hollow portion engaging said grooves of said studs retaining said studs in position extended into said hollow portion, and means for moving said fork-like members to engage and disengage them from said grooves of said studs, said moving means comprising tubular bushings having threads of opposite hand formed in the ends thereof, said fork-like members being arranged in opposed pairs and formed at their adjacent ends with threads of opposite hand engaging said threads of opposite hand formed in the ends of said tubular bushings, and means for rotating said bushings in one direction or the other to extend and retract said fork-like members, said bushing rotating means comprising bevel gears formed on the ends of said bushings, a rotatively supported shaft extended at right angles between said bushings, bevel gears on the ends of said shafts engaging the bevel gears of said bushings, a worm wheel on said shaft, a second rotatively supported shaft extended at right angles to said first shaft, a worm pinion mounted on one end of said second shaft and engaging said worm wheel, and a manually turnable handle mounted on the other end of said second shaft.

THEODORE C. PATECELL.

REFERENCES CITED

The following references are of record in the file of this patent:

UNITED STATES PATENTS

| Number | Name | Date |
|---|---|---|
| 191,699 | McClelland | June 5, 1877 |
| 1,239,500 | Martin | Sept. 11, 1917 |
| 1,259,397 | Hathaway | Mar. 12, 1918 |
| 1,371,989 | Butts | Mar. 15, 1921 |
| 1,431,017 | Martin | Oct. 3, 1922 |
| 1,641,700 | Sperry | Sept. 6, 1927 |
| 1,835,371 | Bellanca | Dec. 9, 1931 |

FOREIGN PATENTS

| Number | Country | Date |
|---|---|---|
| 343,436 | Germany | Nov. 3, 1921 |
| 640,527 | France | Apr. 2, 1928 |
| 69,961 | Norway | Oct. 4, 1943 |